United States Patent
Shi et al.

(10) Patent No.: US 11,089,194 B2
(45) Date of Patent: Aug. 10, 2021

(54) POP-UP CAMERA MODULE AND ELECTRONIC DEVICE

(71) Applicant: BEIJING XIAOMI MOBILE SOFTWARE CO., LTD., Beijing (CN)

(72) Inventors: Lu Shi, Beijing (CN); Lei Liang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/679,687

(22) Filed: Nov. 11, 2019

(65) Prior Publication Data

US 2020/0154010 A1 May 14, 2020

(30) Foreign Application Priority Data

Nov. 13, 2018 (CN) .......................... 201811345059.9

(51) Int. Cl.
*H04N 5/225* (2006.01)
*G03B 17/12* (2021.01)
*G03B 17/04* (2021.01)

(52) U.S. Cl.
CPC ........... *H04N 5/2257* (2013.01); *G03B 17/04* (2013.01); *G03B 17/12* (2013.01); *H04N 5/2254* (2013.01)

(58) Field of Classification Search
CPC .... H04N 5/2257; H04N 5/2251–2259; H04M 1/0264; G06F 1/16; G06F 1/1613–1615; G06F 1/1626; G06F 1/1628; G06F 1/1633; G06F 1/1656–1658; G06F 1/1675–1677; G06F 1/1686; G03B 17/04; G03B 17/02–17; H02K 41/02–0358
See application file for complete search history.

(56) References Cited

U.S. PATENT DOCUMENTS

| | | | |
|---|---|---|---|
| 2009/0103911 A1 | 4/2009 | Ikemizo et al. | |
| 2015/0015729 A1 | 1/2015 | Kasamatsu | |
| 2017/0223158 A1* | 8/2017 | Yin | H04M 1/02 |
| 2018/0262663 A1* | 9/2018 | Zhang | H04N 5/2254 |
| 2019/0129466 A1* | 5/2019 | Zeng | H04M 1/0237 |

(Continued)

FOREIGN PATENT DOCUMENTS

| | | |
|---|---|---|
| CN | 104081272 A | 10/2014 |
| CN | 206077465 U | 4/2017 |

(Continued)

OTHER PUBLICATIONS

European Patent Office, Extended European Search Report Issued in Application No. 19208838.3, dated Feb. 11, 2020, Germany, 9 pages.

*Primary Examiner* — Paul M Berardesca
(74) *Attorney, Agent, or Firm* — Syncoda LLC; Feng Ma (57) ABSTRACT

A camera module includes: a control body, a lens assembly and at least one magnetic member. The control body includes a circuit board and a spatial magnetic field sensing member disposed on the circuit board. The lens assembly is configured to be controlled to move, so as to generate relative displacement between the lens assembly and the spatial magnetic field sensing member. The at least one magnetic member is assembled to the lens assembly to generate a preset magnetic field around the lens assembly. Along with a movement of the lens assembly, the spatial magnetic field sensing member senses changes of the preset magnetic field.

20 Claims, 4 Drawing Sheets

(56) References Cited

U.S. PATENT DOCUMENTS

| | | | | |
|---|---|---|---|---|
| 2019/0132971 A1* | 5/2019 | Zeng | ................... | H04M 1/0237 |
| 2019/0138062 A1* | 5/2019 | Zeng | ................... | H04M 1/0237 |
| 2019/0342432 A1* | 11/2019 | Chen | ................... | H04M 1/0216 |
| 2020/0125707 A1* | 4/2020 | Lin | ....................... | G06F 1/1624 |
| 2020/0351395 A1* | 11/2020 | Yang | ...................... | G03B 17/04 |

FOREIGN PATENT DOCUMENTS

| | | | | |
|---|---|---|---|---|
| CN | 107197124 | A | 9/2017 | |
| CN | 107819907 | A | 3/2018 | |
| CN | 207782888 | U | 8/2018 | |
| CN | 108696679 | A | 10/2018 | |
| CN | 208015787 | U | 10/2018 | |
| CN | 108769305 | A | 11/2018 | |
| CN | 108769496 | A | 11/2018 | |
| CN | 109873949 | * | 6/2019 | |
| CN | 109951702 | * | 6/2019 | |
| WO | 2017126736 | A1 | 7/2017 | |
| WO | WO-2019184978 | A1 * | 10/2019 | .......... H04M 1/0264 |

* cited by examiner

POP-UP CAMERA MODULE AND ELECTRONIC DEVICE

CROSS-REFERENCE TO RELATED APPLICATION

This application claims priority to Chinese Patent Application No. 201811345059.9 filed on Nov. 13, 2018, the disclosure of which is hereby incorporated by reference in its entirety.

BACKGROUND

In the related art, a pop-up camera module is installed in an electronic device and has the following two states: the camera is received in the electronic device when not used to ensure the screen-to-body ratio and the overall aesthetics of the electronic device; and the camera pops out of the electronic device in a case of use to realize a corresponding photographing function.

SUMMARY

The present disclosure relates generally to the field of electronic technologies, and more specifically to a camera module and an electronic device.

Various embodiments of the present disclosure provides a camera module and an electronic device to simplify structural complexity of the camera module and improve use effects of the camera module and the electronic device.

According to a first aspect of the present disclosure, a camera module is provided. The camera module includes a control body, a lens assembly and at least one magnetic member. The control body includes a circuit board and a spatial magnetic field sensing member disposed on the circuit board. The lens assembly is configured to be controlled to move, so as to generate relative displacement between the lens assembly and the spatial magnetic field sensing member. The at least one magnetic member is assembled onto the lens assembly to generate a preset magnetic field around the lens assembly. Along with a movement of the lens assembly, the spatial magnetic field sensing member senses changes of the preset magnetic field.

According to a second aspect of the present disclosure, an electronic device is provided. The electronic device includes a processor, the above camera module and a machine-readable storage medium storing machine-executable instructions. The processor is coupled with the spatial magnetic field sensing member and the lens assembly. When invoking the machine-executable instructions, the processor is caused to receive position information of the lens assembly through the spatial magnetic field sensing member, and control the lens assembly to move toward a target position based on user's instructions and the position information. The target position includes an initial position and a pop-up position of the lens assembly.

It is understood that the above general descriptions and subsequent detailed descriptions are merely illustrative and explanatory and shall not be intended to limit the present disclosure.

BRIEF DESCRIPTION OF DRAWINGS

The accompanying drawings, which are incorporated in and constitute a part of the present description, illustrate examples consistent with the present disclosure and serve to explain the principles of the present disclosure together with the description.

DETAILED DESCRIPTION

Various embodiments will be described in detail herein, examples of which are illustrated in the accompanying drawings. When the following descriptions involve the drawings, like numerals in different drawings represent like or similar elements unless stated otherwise. The implementations described in the following exemplary embodiments do not represent all implementations consistent with the present disclosure. On the contrary, they are merely examples of an apparatus and a method consistent with some aspects of the present disclosure as recited in detail in the appended claims.

When a movable camera module such as a pop-up camera is adopted in an electronic device such as a mobile phone, the movable camera module can move outside the electronic device during usage to obtain incident light and complete a corresponding photographing function. Further, after being used, the movable camera module is withdrawn into the inside of the electronic device to avoid occupation on a screen of the electronic device. In this way, overall appearance of the electronic device is improved.

However, a mechanical control mechanism for realizing pop-up and reset functions of the camera usually increases structural complexity of the camera module. Various embodiments of the present disclosure can reduce structural complexity of a pop-up camera and improve use effects of a camera module and an electronic device.

During a process of pop-up and reset movements, not only a drive control but also location monitoring for a camera are desired. In this way, stepping accuracy and use effect of the camera are guaranteed.

Figure 1:
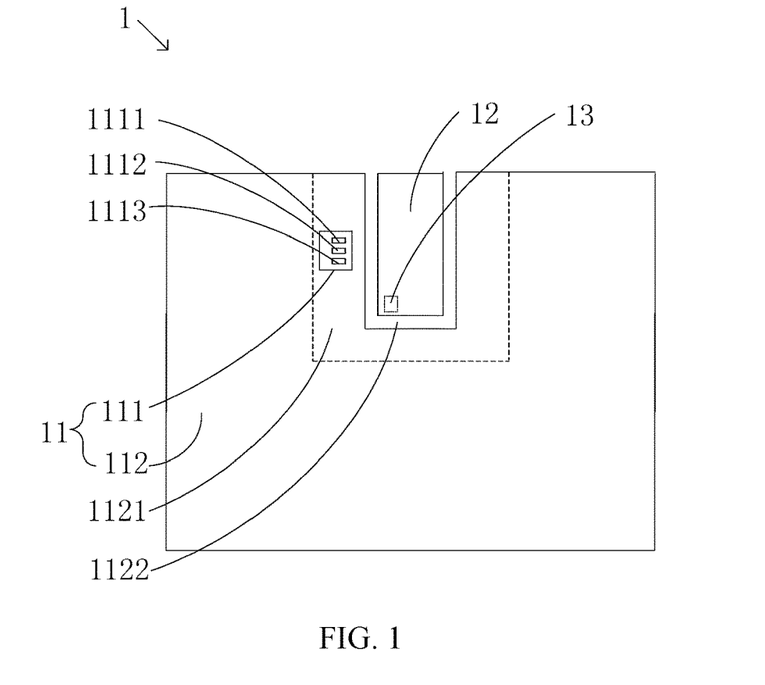
FIG. 1 is a schematic diagram illustrating a structure of a camera module when a lens assembly is at an initial position according to embodiments of the present disclosure.
Figure 2:
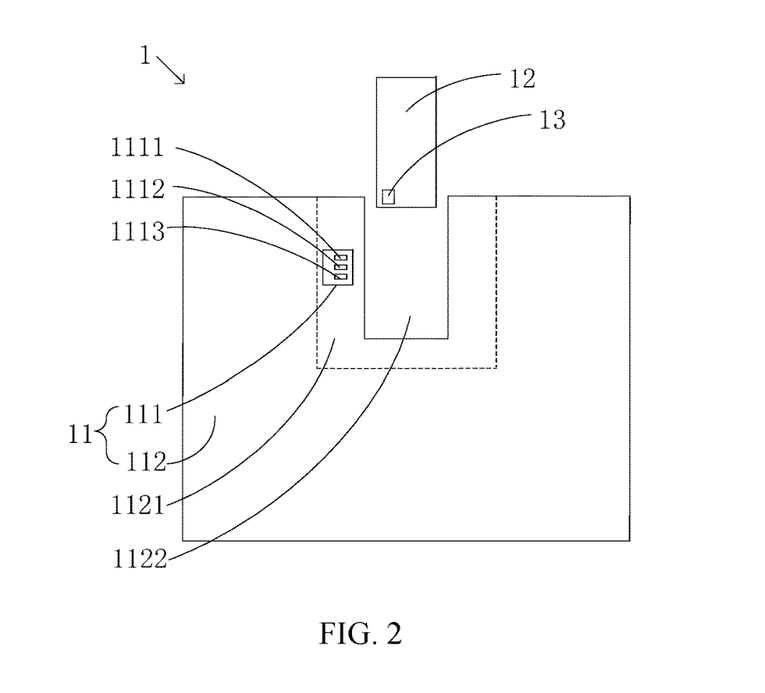
FIG. 2 is a schematic diagram illustrating a structure of a camera module when a lens assembly is at a pop-up position according to embodiments of the present disclosure.

FIG. 1 is a schematic diagram illustrating a structure of a camera module when a lens assembly is at an initial position according to an embodiment of the present disclosure. FIG. 2 is a schematic diagram illustrating a structure of a camera module when a lens assembly is at a pop-up position according to an embodiment of the present disclosure.

As shown in FIGS. 1 and 2, the camera module 1 includes a control body 11, a lens assembly 12 and at least one magnetic member 13. The control body 11 includes a circuit board 112, and at least one spatial magnetic field sensing member 111 disposed at the circuit board 112. For example, at least one spatial magnetic field sensing member 111 can be in contact with the circuit board 112. The magnetic member 13 is assembled to the lens assembly 12 to generate a preset magnetic field around the lens assembly 12. The lens assembly 12 is configured to be controlled to move, so as to generate relative displacement between the lens assembly 12 and the spatial magnetic field sensing member 111. Along with the movement of the lens assembly 12, the spatial magnetic field sensing member 111 senses changes of the preset magnetic field.

The various device components, units, blocks, or portions may have modular configurations, or are composed of discrete components, but nonetheless can be referred to as "modules" in general. In other words, the "components," "modules," "blocks," "portions," or "units" referred to herein may or may not be in modular forms.

With the above structural arrangement, the spatial magnetic field sensing member 111 is capable of sensing magnetic field changes due to the changes in the position of the lens assembly 12, such that the position of the lens assembly 12 is accurately located based on the sensed magnetic field change. The lens assembly 12 can be located through one spatial magnetic field sensing member 111, which reduces the occupation area of the control body 11, structural complexity and costs of the camera module 1, improves the locating accuracy, and meanwhile reduces the space occupancy rate of the camera module 1 to an electronic device 2.

In the above embodiments, the spatial magnetic field sensing member 111 includes a first sensing unit 1111, a second sensing unit 1112 and a third sensing unit 1113. The first sensing unit 1111 is configured to sense magnetic field changes in a length direction of the lens assembly, the second sensing unit 1112 is configured to sense magnetic field changes in a width direction of the lens assembly, and the third sensing unit 1113 is configured to sense magnetic field changes in a thickness direction of the lens assembly.

Through the first sensing unit 1111, the second sensing unit 1112 and the third sensing unit 1113, the spatial magnetic field sensing member 111 obtains magnetic field changes in three directions, that is directions of X axis, Y axis and Z axis, of a spatial coordinate system based on the lens assembly, which increases sensing accuracy of the spatial magnetic field sensing member 111 for the magnetic field changes.

It is to be noted that the spatial magnetic field sensing member 111 includes a Hall element. The Hall element may be a three-axis digital Hall element configured to sense magnetic field changes in three directions of the spatial coordinate system.

The spatial magnetic field sensing member 111 is assembled onto the circuit board 112 and associated with the at least one magnetic member 13 on the lens assembly 12 to determine a position of the lens assembly 12. For this, arrangement manners of both the spatial magnetic field sensing member 111 and the magnetic member 13 will be illustrated below respectively.

In some embodiments, the circuit board 112 may include a dodging portion 1122. A length of the lens assembly 12 in a movement direction, for example, a longitudinal direction of the lens assembly, is matched with a depth of the dodging portion 1122 in the moving direction, so that the lens assembly 12 may be selectively protruded out of the dodging portion 1122 or received in the dodging portion 1122, thereby reducing an entire volume of the camera module 1. The circuit board 112 includes an edge region 1121 adjacent to the dodging portion 1122. The spatial magnetic field sensing member 111 is disposed in the edge region 1121. The spatial magnetic field sensing member 111 disposed in the edge region 1121 is close to the lens assembly 12 and the magnetic member 13 disposed on the lens assembly 12. Thus, the sensing sensitivity of the spatial magnetic field sensing member 111 for the magnetic field is improved and a sensing error, which is caused by an excessively large distance between the spatial magnetic field sensing member 111 and the magnetic member 13, is avoided.

Further, in the movement direction of the lens assembly 12, the edge region 1121 includes a top portion, a bottom portion, and a middle portion between the top portion and the bottom portion. The spatial magnetic field sensing member 111 is disposed in the middle portion. At this time, distances between the magnetic member 13 on the lens assembly 12 and the spatial magnetic field sensing member 111 are relatively average, no matter whether the lens assembly 12 is at a pop-up position or an initial position. In this case, a problem of a poor magnetic field sensing effect, which is caused by such a movement that the lens assembly 12 moves away from the spatial magnetic field sensing member 111, is avoided, and thus the locating accuracy of the lens assembly 12 is improved.

Figure 3:
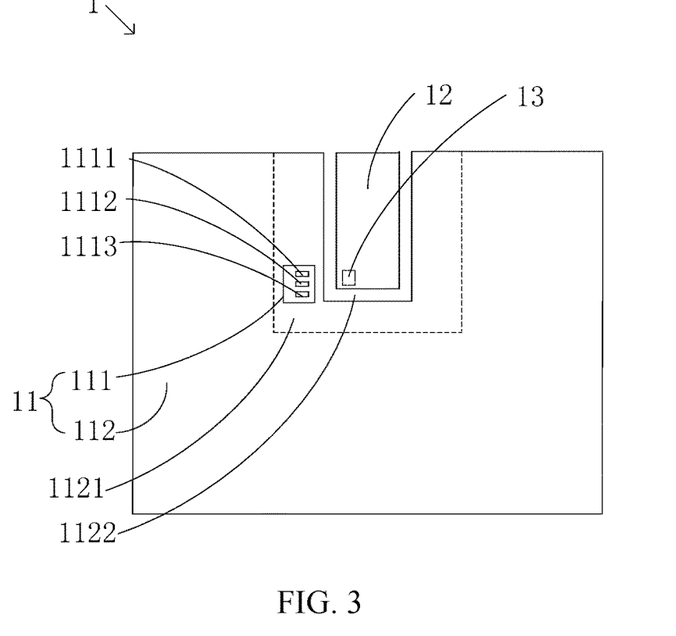
FIG. 3 is a schematic diagram illustrating a structure of a camera module according to another embodiment of the present disclosure.

Alternatively, the spatial magnetic field sensing member 111 may also be disposed at the top portion or the bottom portion of the edge region 1121 as shown in FIG. 3, so as to perform structural dodging for other electronic elements on the circuit board 112. The specific position of the spatial magnetic field sensing member 111 is not limited in the present disclosure.

In other embodiments, the lens assembly 12 includes a front end and a rear end disposed along the movement direction. The number of the magnetic member 13 is one and the magnetic member is assembled onto the front end or the rear end. The magnetic member 13 disposed on the lens assembly 12, on one hand, reduces structural complexity of the lens assembly 12, and on the other hand, lowers the entire volume of the lens assembly 12 and improves the stability as well as reliability of the lens assembly 12 during a moving process. Disposing the magnetic member 13 at the front end or the rear end of the lens assembly 12 facilitates the assembly of the magnetic member 13 and reduces structural interference for other functional components of the lens assembly 12.

In some embodiments, the magnetic member 13 may also be disposed between the front end and the rear end to reduce the change of a distance between the magnetic member 13 and the spatial magnetic field sensing member 111 during the moving process of the lens assembly 12, thereby ensuring persistent strength of the sensed magnetic field.

Figure 4:
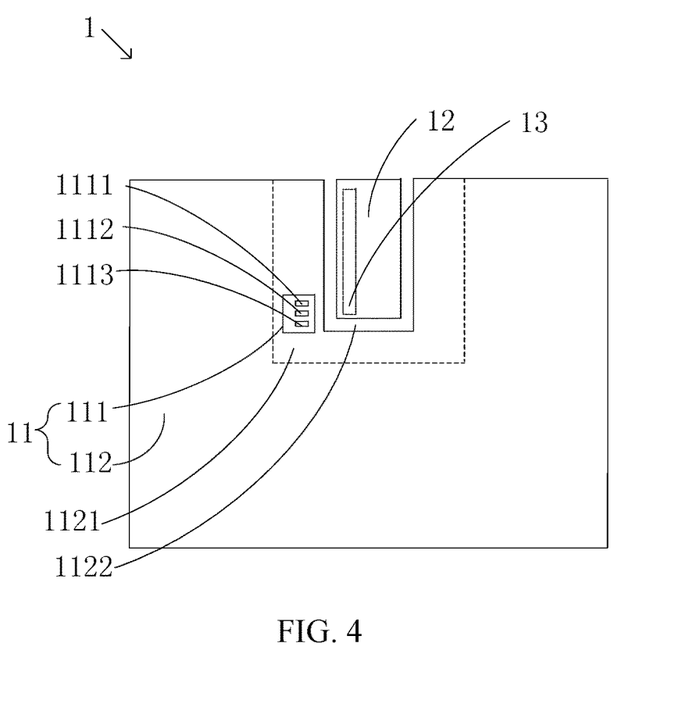
FIG. 4 is a schematic diagram illustrating a structure of a camera module according to yet another embodiment of the present disclosure.

In some embodiments, as shown in FIG. 4, a length of the magnetic member 13 is matched with the length of the lens assembly 12 to reduce the change of the distance between the magnetic member 13 and the spatial magnetic field sensing member 111 during the moving process of the lens assembly 12, thereby ensuring persistent strength of the sensed magnetic field.

Figure 5:
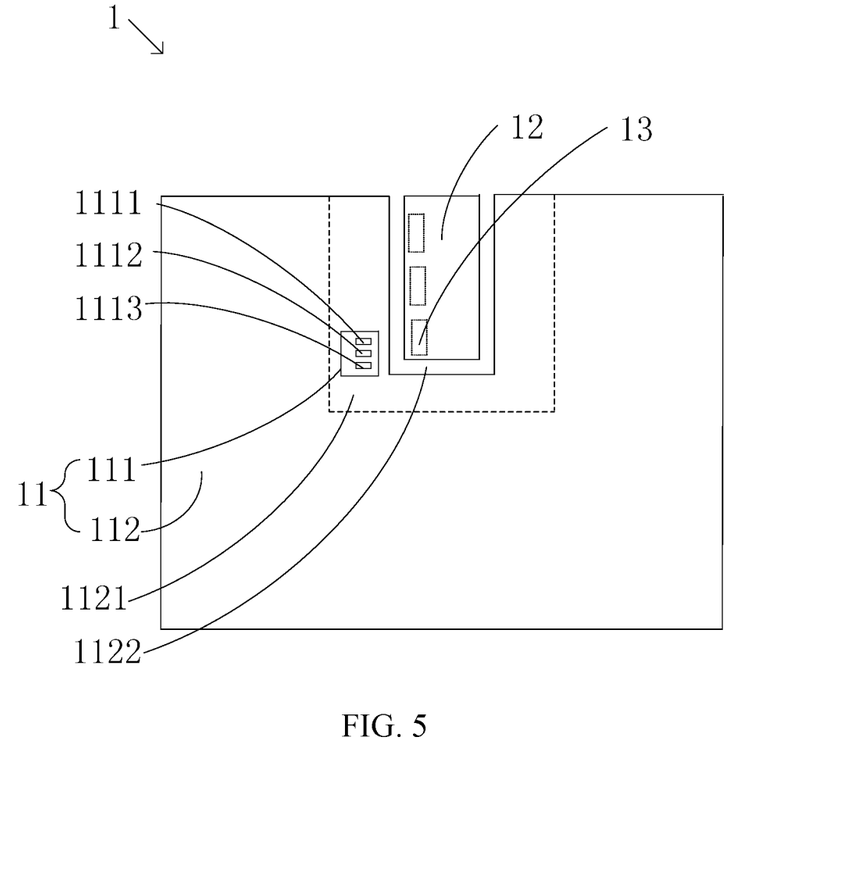
FIG. 5 is a schematic diagram illustrating a structure of a camera module according to some other embodiments of the present disclosure.

In some other embodiments, there are a plurality of magnetic members 13 (for example, three magnetic members as shown in FIG. 5) which are disposed at intervals along the movement direction of the lens assembly 12. The plurality of spaced magnetic members 13 increase the strength of the sensed magnetic field and facilitate sensing and monitoring of the spatial magnetic field sensing member 111. The spaced magnetic members 13 also help to perform dodging for other functional components of the lens assembly 12, thereby reducing structural interference of the magnetic members 13 for other functional components of the lens assembly 12.

In some embodiments, the plurality of magnetic members 13 may also be disposed on the lens assembly 12 in another arrangement manner, for example, may be disposed according to structures of the functional components of the lens assembly 12, which is not limited in the present disclosure.

Figure 6:
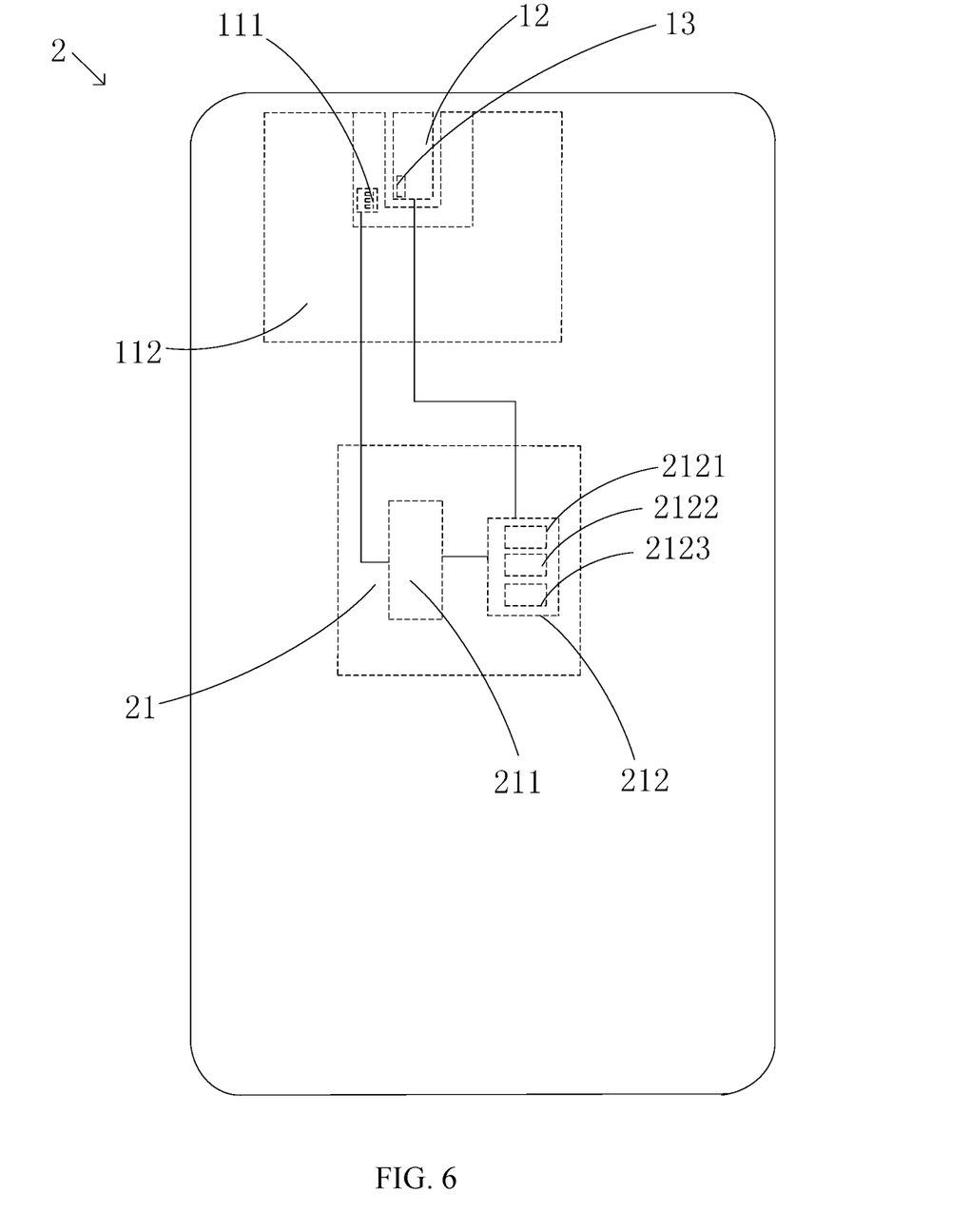
FIG. 6 is a schematic diagram illustrating a structure of an electronic device according to embodiments of the present disclosure.

Various embodiments of the present disclosure further provide an electronic device 2, which can be a mobile phone, a tablet computer, a personal digital assistant, etc.

As shown in FIG. 6, the electronic device 2 includes a processor 21 and the camera module 1. The processor 21 includes a first controlling module 211, and a second controlling module 212. The first controlling module 211 is coupled with the spatial magnetic field sensing member 111 to receive position information of the lens assembly 12. The second controlling module 212 is coupled with the first controlling module 211 and the lens assembly 12 respectively, so as to control the lens assembly 12 to move toward a target position based on user's instructions and the position information obtained from the first controlling module 211. The target position includes an initial position or a pop-up position of the lens assembly 12.

The second controlling module 212 includes a stepping unit 2121, an obtaining unit 2122 and a determining unit 2123. The stepping unit 2121 is configured to send a plurality of stepping instructions continuously to the lens assembly 12 based on user's instructions, so that the lens assembly 12 moves toward the target position based on the stepping instructions. The obtaining unit 2122 is coupled with the first controlling module 211 to obtain the position information of the lens assembly 12. After the last stepping instruction is sent, the determining unit 2123 determines whether the position information of the lens assembly 12 is matched with the target position information, and controls the lens assembly 12 to return to the initial position if not matched.

For example, when the lens assembly 12 is at the initial position, the second controlling module 212 receives an instruction for starting the camera module 1 from a user, and a plurality of stepping instructions are sent to the lens assembly 12 via the stepping unit 2121 based on said instruction. In this case, the lens assembly 12 is controlled to continuously move toward the pop-up position under the drive of a stepping motor (not shown). During this period, the spatial magnetic field sensing member 111 continuously monitors changes of the spatial magnetic field, and determines the position of the lens assembly 12 based on the changes of the spatial magnetic field. The first controlling module is coupled with the spatial magnetic field sensing member 111 to receive the position information of the lens assembly 12. The obtaining unit 2122 is coupled with the first controlling module 211 to obtain the position information of the lens assembly 12. After the last stepping instruction is sent, the determining unit 2123 determines whether the position information of the lens assembly 12 is matched with the position information of the pop-up position. If yes, it is determined that the lens assembly 12 pops up normally; and if not, it is determined that the lens assembly 12 fails to pop up, and the lens assembly 12 is controlled to return to the initial position.

Similarly, when the lens assembly 12 is at the pop-up position, the second controlling module 212 receives an instruction for shutting down the camera module 1 from the user, and a plurality of stepping instructions are sent to the lens assembly 12 continuously via the stepping unit 2121 based on said instruction. In this case, the lens assembly 12 is controlled to continuously move toward the initial position under the drive of the stepping motor. During this period, the spatial magnetic field sensing member 111 continuously monitors changes of the spatial magnetic field, and determines the position information of the lens assembly 12 based on the changes of the spatial magnetic field. The first controlling module is coupled with the spatial magnetic field sensing member 111 to receive the position information of the lens assembly 12. The obtaining unit 2122 is coupled with the first controlling module 211 to obtain the position information. After the last stepping instruction is sent, the determining unit 2123 determines whether the position information of the lens assembly 12 is matched with the position information of the initial position. If yes, it is determined that the lens assembly 12 withdraws normally; and if not, it is determined that the lens assembly 12 fails to withdraw, and control instructions are resent to control the lens assembly 12 to return to the initial position.

In some embodiments of the present disclosure, an electronic device is further provided. The electronic device includes: the above camera module 1; a processor 21, configured to be coupled with one spatial magnetic field sensing member 111 and the lens assembly 12; and a machine-readable storage medium storing machine-executable instructions. When invoking the machine-executable instructions, the processor 21 is caused to perform the following operations: receiving position information of the lens assembly 12 through the spatial magnetic field sensing member 111; and controlling the lens assembly 12 to move toward a target position based on user's instructions and said position information. The target position includes an initial position or a pop-up position of the lens assembly 12.

Further, when invoking the machine-executable instructions, the processor 21 is further caused to perform the following operations: sending a plurality of stepping instructions to the lens assembly 12 based on user's instructions, so that the lens assembly 12 moves toward the target position based on the stepping instructions; and after a last stepping instruction is sent, determining whether the position information of the lens assembly 12 is matched with the information of the target position, and controlling the lens assembly 12 to return to the initial position if not matched.

By disposing one spatial magnetic field sensing member 111 on the control body 11 of the camera module 1 of the electronic device 2 and disposing at least one magnetic member 13 on the lens assembly 12 configured to be controlled to move, the spatial magnetic field sensing member 111 senses changes of the magnetic field due to the changes in the position of the lens assembly 12, so that the position information of the lens assembly 12 is monitored. In this way, such a problem is avoided: the lens assembly 12 may not reach the target position indicated by the user's instructions due to the stall and the step loss of the stepping motor during the pop-up process and the withdrawal process. And the failure probability of the lens assembly 12 is also reduced, and the user's experiences of the camera module 1 and the electronic device 2 are also improved.

In the above structure, the lens assembly 12 is located through one spatial magnetic field sensing member 111, which reduces the occupation area of the control body 11, structural complexity and costs of the camera module 1, improves the locating accuracy, and meanwhile reduces the space occupancy rate of the camera module 1 to the electronic device 2.

It is to be noted that the electronic device 2 may be a mobile phone, a computer and so on, which is not limited herein.

Various embodiments of the present disclosure can have one or more of the following advantages.

For example, one spatial magnetic field sensing member is disposed for the control body of the camera module and at least one magnetic member is disposed on the lens assembly configured to be controlled to move, so that the spatial magnetic field sensing member senses magnetic field changes generated by the lens assembly at different positions, thereby accurately locating the position of the lens assembly based on the sensed magnetic field changes. In the above structure, the lens assembly is located through one spatial magnetic field sensing member, which reduces the occupation area of the control body, structural complexity and costs of the camera module, and improves the locating accuracy, and meantime reduces the space occupancy rate of the camera module to the electronic device.

In some embodiments, the positioning of the lens assembly can be realized, based on the 3D spatial distribution of the magnetic fields and its variations. For example, the positioning along the longitudinal direction of the lens assembly can be realized. In this way, the occupation area of the control body can be reduced.

It should be understood that "a plurality" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A camera module, comprising:
a control body, comprising a circuit board, and a spatial magnetic field sensing member disposed on the circuit board;
a lens assembly, configured to be controlled to move between an initial position and a pop-up position, so as to generate relative displacement between the lens assembly and the spatial magnetic field sensing member; and at least one magnetic member, assembled to the lens assembly to generate a preset magnetic field around the lens assembly;

wherein along with a movement of the lens assembly, the spatial magnetic field sensing member is configured to sense changes of the preset magnetic field in a length direction, a width direction and a thickness direction of the lens assembly when the lens assembly is at different positions between the initial position and the pop-up position, as well as at the initial position and the pop-up position.

2. The camera module according to claim 1, wherein the lens assembly comprises a front end and a rear end disposed along a movement direction, and the at least one magnetic member is assembled onto the front end or the rear end.

3. The camera module according to claim 1, wherein the lens assembly comprises a front end and a rear end disposed along a movement direction, and the at least one magnetic member is assembled between the front end and the rear end.

4. The camera module according to claim 1, wherein a length of the at least one magnetic member is matched with a length of the lens assembly.

5. The camera module according to claim 1, wherein the at least one magnetic member comprises a plurality of magnetic members, and the plurality of magnetic members are arranged at intervals along a movement direction of the lens assembly.

6. The camera module according to claim 1, wherein the circuit board comprises a dodging portion, and a length of the lens assembly in a movement direction is matched with a depth of the dodging portion in the movement direction, so that the lens assembly is selectively protruded out of or received in the dodging portion.

7. The camera module according to claim 6, wherein the circuit board comprises an edge region adjacent to the dodging portion, and the spatial magnetic field sensing member is disposed in the edge region.

8. The camera module according to claim 7, wherein the edge region comprises a top portion, a bottom portion and a middle portion between the top portion and the bottom portion in the movement direction of the lens assembly, and the spatial magnetic field sensing member is disposed in the middle portion.

9. The camera module according to claim 7, wherein the edge region comprises a top portion, a bottom portion and a middle portion between the top portion and the bottom portion in the movement direction of the lens assembly, and the spatial magnetic field sensing member is disposed at the top portion or the bottom portion.

10. The camera module according to claim 1, wherein the spatial magnetic field sensing member comprises a first sensing unit, a second sensing unit and a third sensing unit; the first sensing unit is configured to sense magnetic field changes in the length direction of the lens assembly, the second sensing unit is configured to sense magnetic field changes in the width direction of the lens assembly and the third sensing unit is configured to sense magnetic field changes in the thickness direction of the lens assembly.

11. The camera module according to claim 1, wherein the spatial magnetic field sensing member comprises a Hall element.

12. An electronic device, comprising:
the camera module according to claim 1;
a processor coupled with the spatial magnetic field sensing member and the lens assembly, wherein the processor is configured to locate a position of the lens assembly based on changes in sensed 3D spatial distribution of the preset magnetic field; and
a machine-readable storage medium storing machine-executable instructions;
wherein upon invoking the machine-executable instructions, the processor is configured to perform:
receiving position information of the lens assembly through the spatial magnetic field sensing member, wherein the position information is determined based on changes of the preset magnetic field by the spatial magnetic field sensing member when the lens assembly is at different positions between the initial position and the pop-up position, as well as at the initial position and the pop-up position; and
controlling the lens assembly to move toward a target position based on user's instructions and the position information, wherein the target position comprises an initial position or a pop-up position of the lens assembly.

13. The electronic device according to claim 12, wherein upon invoking the machine-executable instructions, the processor is further caused to perform:
sending a plurality of stepping instructions to the lens assembly based on the user's instructions, so that the lens assembly is moved toward the target position based on the plurality of stepping instructions; and
after a last stepping instruction of the plurality of stepping instructions is sent, determining whether the position information of the lens assembly is matched with target position information, and controlling the lens assembly to return to the initial position if not matched.

14. The electronic device according to claim 12, wherein the lens assembly of the camera module comprises a front end and a rear end disposed in a movement direction, and the at least one magnetic member of the camera module is assembled to the front end or the rear end.

15. The electronic device according to claim 12, wherein the lens assembly of the camera module comprises a front end and a rear end disposed in a movement direction, and the at least one magnetic member of the camera module is assembled between the front end and the rear end.

16. The electronic device according to claim 12, wherein a length of the at least one magnetic member of the camera module is matched with a length of the lens assembly of the camera module.

17. The electronic device according to claim 12, wherein the at least one magnetic member of the camera module comprises a plurality of magnetic members, and the plurality of magnetic members are arranged at intervals along a movement direction of the lens assembly.

18. The electronic device according to claim 12, wherein the circuit board of the camera module comprises a dodging portion, and a length of the lens assembly of the camera module in a movement direction is matched with a depth of the dodging portion in the movement direction, so that the lens assembly is selectively protruded out of or received in the dodging portion.

19. The electronic device according to claim 18, wherein the circuit board comprises an edge region adjacent to the dodging portion, and the spatial magnetic field sensing member of the camera module is disposed in the edge region.

20. The electronic device according to claim 19, wherein the edge region comprises a top portion, a bottom portion and a middle portion between the top portion and the bottom portion in the movement direction of the lens assembly, and the spatial magnetic field sensing member is disposed at the middle portion.

* * * * *